(12) United States Patent
Meier

(10) Patent No.: US 10,696,168 B2
(45) Date of Patent: Jun. 30, 2020

(54) CHARGING CONNECTION APPARATUS FOR A MOTOR VEHICLE

(71) Applicant: Dr. Ing. h.c.F. Porsche Aktiengesellschaft, Stuttgart (DE)

(72) Inventor: Steffen Meier, Freudental (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 0 days.

(21) Appl. No.: 15/926,404

(22) Filed: Mar. 20, 2018

(65) Prior Publication Data

US 2018/0208068 A1   Jul. 26, 2018

Related U.S. Application Data

(63) Continuation-in-part of application No. 13/917,059, filed on Jun. 13, 2013, now abandoned.

(30) Foreign Application Priority Data

Jun. 14, 2012 (DE) .................. 10 2012 105 139

(51) Int. Cl.
| | |
|---|---|
| H02J 7/00 | (2006.01) |
| B60L 11/18 | (2006.01) |
| B60K 1/04 | (2019.01) |
| H01R 13/64 | (2006.01) |
| B60L 53/18 | (2019.01) |
| B60L 53/16 | (2019.01) |
| H01R 31/06 | (2006.01) |
| H01R 107/00 | (2006.01) |
| B60L 53/31 | (2019.01) |

(52) U.S. Cl.
CPC ............ B60L 11/1818 (2013.01); B60K 1/04 (2013.01); B60L 53/16 (2019.02); B60L 53/18 (2019.02); H01R 13/64 (2013.01); *B60L 53/31* (2019.02); *H01R 31/06* (2013.01); *H01R 2107/00* (2013.01); *H01R 2201/26* (2013.01); *Y02T 10/7005* (2013.01); *Y02T 90/121* (2013.01)

(58) Field of Classification Search
CPC ...... B60L 11/1818; B60L 53/16; B60L 53/18; B60K 1/04; H01R 13/64
USPC ......................................... 320/109; 362/459
See application file for complete search history.

(56) References Cited

U.S. PATENT DOCUMENTS

| | | | | |
|---|---|---|---|---|
| 4,871,902 A | * | 10/1989 | Kicherer ................. | H05B 3/68 219/458.1 |
| 2012/0268062 A1 | * | 10/2012 | Yoneda .................. | B60L 53/16 320/107 |

* cited by examiner

*Primary Examiner* — Zixuan Zhou
(74) *Attorney, Agent, or Firm* — Gerald E. Hespos; Michael J. Porco; Matthew T. Hespos

(57) ABSTRACT

A motor vehicle (2) has a vehicle body (4) and at least one electrical energy storage means. A charging connection apparatus is mounted to the vehicle body (4) and can be connected to a charging plug (8) supplied from the outside for charging the electrical energy storage means. The charging connection apparatus has an adapter (10) mounted to the vehicle body (4), a charging housing (12) mounted to the adapter (10) and a plug (14) mounted in the charging housing (12). The plug (14) is connected to the electrical energy storage means and can be connected to the charging plug (8). The adapter (10), the charging housing (12) and the plug (14) are configured to conform to the charging plug (8) in the country where the motor vehicle (2) is used.

5 Claims, 2 Drawing Sheets

CHARGING CONNECTION APPARATUS FOR A MOTOR VEHICLE

CROSS REFERENCE TO RELATED APPLICATION

This application is a continuation-in-part of U.S. patent application Ser. No. 13/917,059, filed Jun. 13, 2013, which in turn claims priority under 35 USC 119 to German Patent Appl. No. 10 2012 105 139.9 filed on Jun. 14, 2012, the entire disclosure of which is incorporated herein by reference.

BACKGROUND OF THE INVENTION

1. Field of the Invention

The invention relates to a charging connection apparatus for a motor vehicle for charging at least one electrical energy storage means that is connected electrically to a plug part arranged in a vehicle body by means of a housing so that the plug part can be connected to a charging plug supplied from the outside.

2. Description of the Related Art

Charging connection apparatuses have been known in the prior art for a long time. Motor vehicles equipped with charging connection apparatuses of this kind generally are called plug-in hybrid vehicles or plug-in electric vehicles, depending on the motor concept chosen. An energy storage means, usually a battery, of the vehicle can be charged, for example, by connecting the charging connection apparatus to an external power supply network, whether by means of a charging station or the freely accessible power supply network.

An arrangement in which a charging housing part is provided with a plug part in a vehicle body is known, for example, from FR 2 954 261. As in the case of the domestic power supply network, there now also are a large number of charging plugs of different design for supplying power to the plug-in vehicles. Accordingly, the vehicle in question has to be equipped with the connection apparatus that matches the charging plug for the countries in question. This requires a great deal of assembly effort and therefore is costly.

US 2012/0268062 shows a charging connector mounting structure for mounting to an area of a vehicle that has inner and outer body parts with openings. An outer box is generally tubular and has an outer end mounted to an interior surface of the outer body part and an inner end projecting toward the opening in the inner body part. An inner box is molded from plastic and has an inner end mounted to the inner body part at the opening therein and an outer end that is intended to line up with the opening in the outer box. A connector connecting portion is mounted to the inner box and has a front end facing toward the exterior of the vehicle and a rear end facing into the vehicle. A cable extends from the rear end of the connector connecting portion and continues to the battery in the vehicle. US 2012/0268062 does not consider the implications of country specific requirements for the connector connecting portion. However, the design shown in US 2012/0268062 would require unique inner and outer boxes for each different country in which the vehicle may be sold.

The object of the invention is to provide a charging connection apparatus that avoids the abovementioned disadvantages in a cost-effective manner.

SUMMARY OF THE INVENTION

The invention relates to an adapter for releasable or non-releasable connection to the vehicle body. A housing is to be fit to the adapter and a plug is fit to the housing. Thus, the vehicle body can be designed in a uniform manner in spite of the different requirements with respect to plug-in technology in the different countries in which the vehicle is sold. The vehicle manufacturer merely has to select the corresponding adapter, housing and plug combination during final assembly. The adapter can be connected releasably or non-releasably to the vehicle body in a known manner. The known releasable and non-releasable connection options also are available for assembly of the housing and plug in the adapter.

The adapter advantageously can be produced from a sheet metal profile. In this case, adapter can have positioning means, for example small cutouts, pins, etc., for connection to the vehicle body with an accurate fit.

The adapter, the charging housing and the plug may form a preassembled unit to achieve a particularly simple and cost-effective assembly. The adapter also advantageously can have various hole patterns for connection to different charging housings to reduce the number of different adapters given suitable external dimensions of different housings.

The charging housing may have a sealing housing to ensure optimum sealing between the vehicle body and the charging housing. The sealing housing also can be made of a different material, for example a flexible plastic to avoid an arrangement that is excessively rigid, and therefore at risk of fracture.

The invention is explained in detail below with reference to the drawings.

DETAILED DESCRIPTION OF THE PREFERRED EMBODIMENTS

Figure 1:
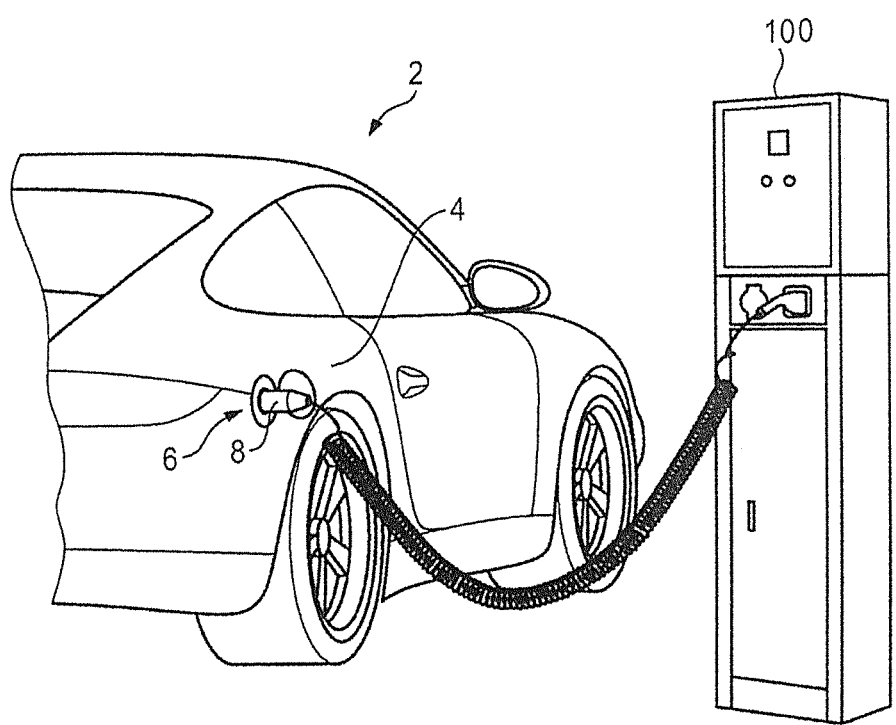
FIG. 1 is a side view of a plug-in motor vehicle.

FIG. 1 is a perspective partial view of a motor vehicle 2 with a vehicle body 4 and a charging connection apparatus 6 arranged in the vehicle body 4. A charging plug 8 of an external charging station 100 engages in the charging connection apparatus 6 for electrically charging an energy storage means—not illustrated. This type of motor vehicle 2 generally is called a plug-in electric vehicle or a plug-in hybrid.

Figure 2:
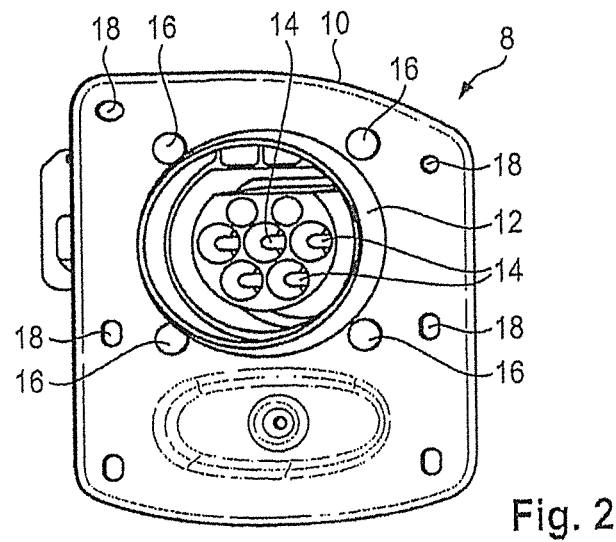
FIG. 2 is a perspective view of a preassembled unit comprising an adapter, a charging housing and a plug.

FIG. 2 shows an embodiment of a charging connection apparatus 8 according to the invention. The charging connection apparatus 6 is designed as a preassembled unit and comprises an adapter 10, a charging housing 12 and a plug 14, with only the connection plugs of the plug 14 being partially illustrated. The charging housing 12 may be formed from a non-conductive resin is connected to the adapter 10 by rivet connections 16 or by adhesive. Unit cutouts 18 are provided in the adapter 10 for releasable or non-releasable connection to the vehicle body 4. Connection options between the adapter 10 and the vehicle body 4 include weld or solder connections and rivet or screw connections. Furthermore, the adapter 10 can have positioning means for achieving a precise and accurate positioning of the adapter 10 relative to the vehicle body 4. The positioning means may be holes or recesses in one of the adapter 10 and the vehicle body 4 and mating projections or dimples in the other of the adapter 10 and the vehicle body 4. It is also feasible for the adapter 10 to have various hole patterns for connection to different charging housings 12.

Figure 3:
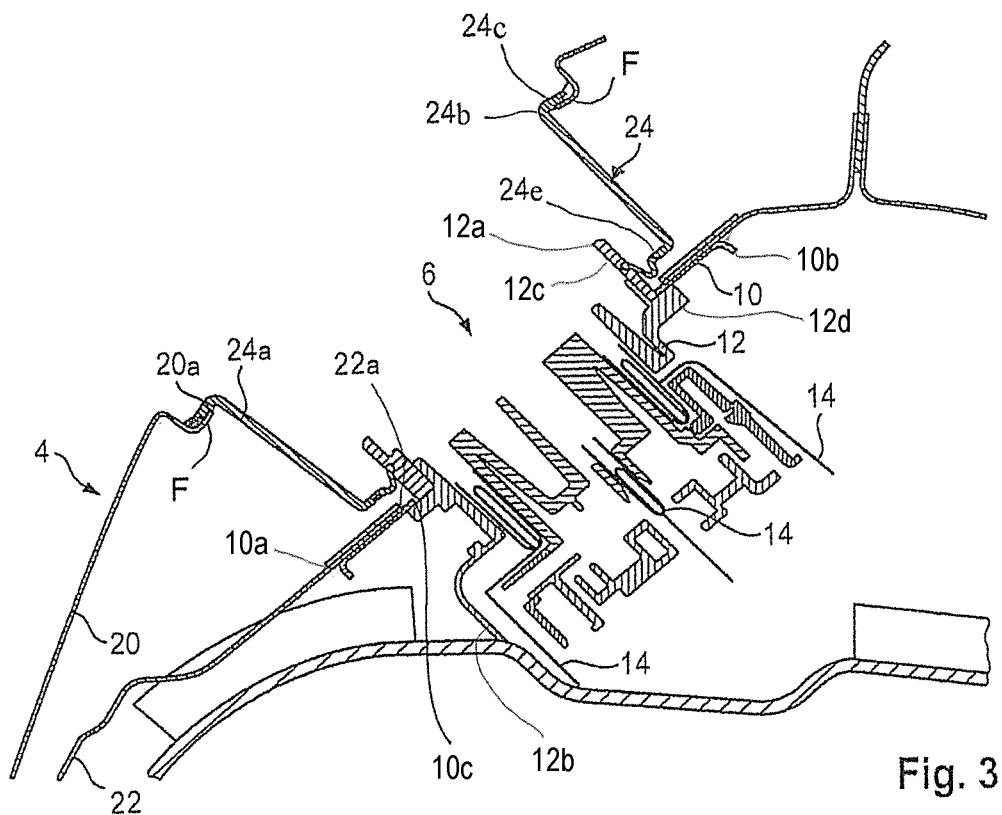
FIG. 3 is a sectional view through a charging connection apparatus arranged in a vehicle body.

FIG. 3 is a sectional view of a further embodiment of a charging connection apparatus 6 arranged in the vehicle body 4. The vehicle body 4 comprises an external vehicle body part 20 and an internal vehicle body part 22 both of which are formed from a sheet metal, a resin material or a fiber reinforced resin. The external vehicle body parts 20 have a flange F recessed inward from the exterior of the vehicle and formed to define an external cutout 20a. The external cutout is dimensioned to accommodate the charging plug 8 shown in FIG. 1. The internal vehicle body part 22 has an internal cutout 22a corresponding to the external cutout 20a. The internal cutout 22a is larger than the outer dimensions of the mounting portion of the largest charging connector 12 required for any of the countries in which the motor vehicle is expected to be sold.

The adapter 10 is generally planar and is a formed from a metal sheet and has an outer periphery 10a that is larger than the inner periphery of the internal cutout 22a of the internal vehicle body part 22. Thus, regions of the adapter 10 inward of the outer periphery 10a are sufficiently large to be mounted on and secured to the inwardly facing surface of the internal vehicle body part 22 at areas surrounding the internal cutout 22a. The connection of the adapter 10 to the internal vehicle body part 22 may include welding, adhesive and/or rivets. Areas of the adapter 10 adjacent the outer periphery 10a include a continuous annular flange 10b projecting away from the interior vehicle body part 22. The flange 10b provides enhanced strength for the adapter 10 and contributes to strength of the internal vehicle body part 22 adjacent the internal cutout 22a. The adapter 10 further includes a mounting aperture 10c with an inner periphery that is cross-sectionally smaller than the internal cutout 22a of the internal vehicle body part 22. Additionally, the mounting aperture 10c is dimensioned to closely receive the charging housing 12 for a particular country. Thus, the size and shape of the mounting aperture 12c will vary in accordance with the country in which the motor vehicle 2 will be sold.

The charging housing 12 is formed from a nonconductive material, such as a synthetic resin, and has a front end 12a and a rear end 12b. Areas of the charging housing 12 adjacent the front end 12a form a hood 12c. The internal and external shape and dimension of the hood 12c will vary from country to country in accordance with power requirements and characteristics in the particular country. However, the external size and shape of the hood 12c will correspond to the size and shape of the mounting aperture 10c in the adapter 10 for a particular country. The charging housing 12 further includes a mounting flange 12d projecting out from an area on the hood 12c rearward of the front end 12a of the charging housing 12. The flange 12d has an outer periphery larger than the mounting aperture 10c in the adapter 10 so that the flange 12d can be affixed to the rear surface of the adapter 10

The plug 14 is mounted in the charging housing 12 and comprises electrically conductive components that can be connected electrically to a battery in the vehicle 2. Additionally, components of the plug 14 are configured to be connected to the charging plug 8 of the charging station as illustrated in FIG. 1 for charging the battery of the vehicle 2.

A generally tubular sealing housing 24 extends from the charging housing 12 to the external vehicle body part 20 in a non-releasable manner to ensure that internal parts of the vehicle 2 are sealed off from areas external of the vehicle 2. The sealing housing 24 has a tubular side wall 24a with an outer end 24b and an outer flange 24c projecting radially out at the outer end 24b of the tubular side wall 24a and an inner flange 24e extending inward from the tubular side wall 24 and connected to the hood 12c of the charging housing 12 at areas between the exterior and interior vehicle body parts 20 and 22. More particularly, the flange 24c of the sealing housing 24 is engaged with the recessed flange F of the exterior vehicle body part 20 so that the flange 24c of the sealing housing 24 rests on an outwardly facing surface of the flange F of the external vehicle body part 20 around the entire periphery of the external cutout 20a.

The adapter 10, the charging housing 12 and the plug 14 for a particular country are selected and preassembled to form a subassembly that can be mounted to the vehicle 2 intended for a particular country. In this regard, the external and internal vehicle body parts 20 and 22 for all of the vehicles 2 regardless of country will be identical. The adapters 10 for all countries also will have the same outer peripheral shape. However, the charging housing 12 will have a shape unique to a particular country and the adapter 10 will have a mounting aperture 10c conforming to the size and shape of the outer periphery of the hood 12c for the particular country. The subassembly of the adapter 10, the charging housing 12 and the plug 14 can be secured to the inwardly facing surface of the interior vehicle body part 22 at areas surrounding the internal cutout 22a. Areas of the adapter 10 outward of the charging housing 12 then can be affixed to the interior vehicle body part 22 outward of the internal cutout 22a. The sealing housing 24 then can be mounted between the flange F of the external vehicle body part 20 and the outer peripheral surface of the hood 12c of the charging housing 12 to complete the assembly.

What is claimed is:

1. A motor vehicle, comprising:
a body having an external vehicle body part defining an exterior of the vehicle and an internal vehicle body part inward of the external vehicle body part, the internal vehicle body part having an outer surface facing the external vehicle body part and the internal vehicle body part further having an inner surface opposite the outer surface of the internal vehicle body part, corresponding external and internal cutouts formed in the external and internal vehicle body parts, respectively, the external vehicle body part having a flange recessed inward from the exterior of the vehicle and surrounding the external cutout;
an electrical energy storage;
a plate-shaped adapter larger than the internal cutout in the internal vehicle body part, the adapter being formed separately from both the external vehicle body part and the internal vehicle body part and having opposite front and rear surfaces, the front surface of the adapter being formed with connection areas thereon non-releasably connected directly to the inner surface of the internal vehicle body part, and the adapter further having a plug mounting opening radially inward from the internal cutout in the internal vehicle body part;
a charging housing coupled to the rear surface of the adapter, a portion of the charging housing being accessible from outside the motor vehicle through the plug mounting opening;

a sealing housing formed from a flexible plastic and having a tubular side wall with open outer and inner ends, an outer flange projecting radially out from the open outer end of the tubular side wall and being non-releasably connected directly to the flange of the external vehicle body part at the external cutout and the sealing housing further having an inner flange extending radially inward from the tubular side wall and connected to the charging housing; and a plug arranged in the charging housing and being connected electrically to the electrical energy storage, the plug and the charging housing being configured to connect with a charging plug supplied from outside in the country in which motor vehicle is used.

2. The motor vehicle of claim 1, wherein the adapter, the charging housing and the plug form a preassembled unit.

3. The motor vehicle of claim 1, wherein the adapter is produced from a sheet metal profile.

4. The motor vehicle of claim 1, wherein the adapter has plural hole patterns for connection to charging housings of different shapes.

5. A motor vehicle, comprising:

a body having an external vehicle body part defining an exterior of the vehicle and an internal vehicle body part inward of the external vehicle body part, the internal vehicle body part having an outer surface facing the external vehicle body part and the internal vehicle body part further having an inner surface opposite the outer surface of the internal vehicle body part, corresponding external and internal cutouts formed in the external and internal vehicle body parts, respectively, the external vehicle body part having a flange recessed inward from the exterior of the vehicle and surrounding the external cutout;

an electrical energy storage;

a sealing housing formed from a flexible plastic having a tubular side wall with open outer and inner ends, with the open outer end of the tubular side wall being non-releasably connected directly to the flange of the external vehicle body part at the external cutout, and the sealing housing further having an inner flange extending radially inward from the tubular side wall; and a pre-assembled charging connection apparatus connected to the internal vehicle body part and the sealing housing, the pre-assembled charging connection apparatus having:

a plate-shaped adapter larger than the internal cutout in the internal vehicle body part, the plate-shaped adapter being formed separately from both the external vehicle body part and the internal vehicle body part and having a front surface non-releasably connected directly to the inner surface of the internal vehicle body part, a rear surface opposite the front surface and a plug mounting opening radially inward from the internal cutout in the internal vehicle body part, the plug mounting opening extending between the front and rear surfaces of the plate-shaped adapter;

a charging housing coupled to the rear surface of the plate shaped adapter, a portion of the charging housing projecting forward through the plug mounting opening in the plate shaped adapter and being connected to the inner flange of the sealing housing so that the charging housing is accessible from outside the motor vehicle through the plug mounting opening;

a plug arranged in the charging housing and being connected electrically to the electrical energy storage, the plug and the charging housing being configured to connect with a charging plug supplied from outside in the country in which motor vehicle is used.

* * * * *